(12) United States Patent
Roesner (10) Patent No.: US 9,842,233 B2
(45) Date of Patent: Dec. 12, 2017

(54) SWITCHABLE RADIO-FREQUENCY IDENTIFICATION TAG DEVICE

(71) Applicant: STAR Systems International Ltd., Kwai Chung (HK)

(72) Inventor: Bruce Roesner, Banner Elk, NC (US)

(73) Assignee: STAR Systems International, Ltd., Kwai Chung (HK)

( * ) Notice: Subject to any disclaimer, the term of this patent is extended or adjusted under 35 U.S.C. 154(b) by 0 days.

(21) Appl. No.: 15/281,931

(22) Filed: Sep. 30, 2016

(65) Prior Publication Data

US 2017/0098106 A1 Apr. 6, 2017

Related U.S. Application Data

(60) Provisional application No. 62/235,755, filed on Oct. 1, 2015.

(51) Int. Cl.
*G06K 7/00* (2006.01)
*G06K 7/10* (2006.01)
*G06K 19/077* (2006.01)

(52) U.S. Cl.
CPC ..... *G06K 7/10237* (2013.01); *G06K 7/10316* (2013.01); *G06K 19/07758* (2013.01)

(58) Field of Classification Search
CPC .......... G06K 7/10237; G06K 7/10316; G06K 19/07758; G06K 19/0723; G06K 19/07345; G06K 19/077
See application file for complete search history.

(56) References Cited

U.S. PATENT DOCUMENTS

| 7,120,987 | B2 | 10/2006 | Liu et al. |
| 7,361,251 | B2 | 4/2008 | Green et al. |
| 7,460,018 | B2 | 12/2008 | Kubo |
| 7,571,694 | B2 | 8/2009 | Boerner |
| 8,350,673 | B2 | 1/2013 | Nyalamadugu et al. |
| 8,944,337 | B2 | 2/2015 | Mullis et al. |
| 2002/0097153 | A1* | 7/2002 | Youbok .............. G06K 19/0672 340/572.5 |

(Continued)

FOREIGN PATENT DOCUMENTS

| CN | 104221037 | 12/2014 |
| CN | 204442374 | 7/2015 |

(Continued)

OTHER PUBLICATIONS

PCT/IB2016/001486 International Search Report and Written Opinion dated Feb. 23, 2017 (12 pages).

*Primary Examiner* — Laura Gudorf
(74) *Attorney, Agent, or Firm* — Michael Best & Friedrich, LLP (57) ABSTRACT

A switchable radio-frequency identification tag device. The device includes a first RFID module positioned on a first plane, at least one un-tuned antenna section positioned on a second plane, a shorting bar positioned on the second plane; and a sliding mechanism configured to move between a first position and a second position. The first plane is positioned parallel to the second plane. The first RFID module is coupled to the at least one un-tuned antenna section to form a tuned RFID tag in the first position. The first RFID module is coupled to the shorting bar in the second position.

15 Claims, 5 Drawing Sheets

(56) References Cited

U.S. PATENT DOCUMENTS

| | | | |
|---|---|---|---|
| 2007/0012773 A1* | 1/2007 | Mickle | G06K 19/07745 235/435 |
| 2007/0144662 A1 | 6/2007 | Armijo et al. | |
| 2007/0290858 A1 | 12/2007 | Janke et al. | |
| 2009/0273474 A1 | 11/2009 | Nonaka | |
| 2010/0283690 A1 | 11/2010 | Artigue et al. | |
| 2010/0302012 A1* | 12/2010 | Roesner | G06K 7/0008 340/10.5 |
| 2012/0280044 A1* | 11/2012 | Mullis | H01Q 1/2225 235/492 |
| 2013/0238405 A1* | 9/2013 | Roesner | G06K 19/0723 705/13 |
| 2015/0163677 A1* | 6/2015 | Launay | H04W 12/08 455/26.1 |

FOREIGN PATENT DOCUMENTS

| | | |
|---|---|---|
| EP | 2230174 | 9/2010 |
| WO | 2008074050 | 6/2008 |
| WO | 2012019768 | 2/2012 |

\* cited by examiner

SWITCHABLE RADIO-FREQUENCY IDENTIFICATION TAG DEVICE

FIELD OF THE INVENTION

Embodiments of the present invention relate to the field of radio-frequency identification.

BACKGROUND OF THE INVENTION

Radio-frequency identification (RFID) tags use electromagnetic fields to wirelessly transfer data. RFID tags include an antenna and an RFID chip, which contains circuits for wirelessly receiving and sending data. The RFID chip is also encoded with data. A reader sends a radio signal to the RFID tag, which receives the signal and transmits its data to the reader. Some RFID tags receive their power from the radio signal sent by a RFID reader (i.e., passive). Other RFID tags are battery-powered (i.e., active). RFID tags can be used to track and identify objects, for example, vehicles.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Environmental and other concerns have led to regulations that favor high-occupancy vehicles over single-occupancy vehicles. For example, the number of people in a vehicle determines where and when the vehicle can legally drive (e.g., in what lanes of a roadway), what tolls the vehicle must pay, or both. A vehicle that transports only the driver is categorized as "SOV" (i.e., a single-occupancy vehicle). A vehicle that transports the driver and at least one other person is categorized as "HOV" (i.e., a high-occupancy vehicle). High-occupancy vehicles that transport the driver and at least two other persons are categorized as "HOV3."

Regulations restricting vehicles based on occupancy may be enforced using RFID readers and tags. For example, RFID readers placed periodically along a HOV lane send radio signals to RFID tags on vehicles, which respond with data indicating the status of the vehicle as SOV, HOV, or HOV3. However, a vehicle's status is not static and an RFID tag with a single code will not accurately report the vehicle's status at all times. Accordingly, embodiments of the present invention provide a switchable RFID tag device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should also be noted that, in the specification and the claims, the terms "above," "below," "beneath," "top," "middle," "bottom," and the like are used in reference to the illustrated embodiments. This is done for ease of description, and should not be considered limiting.

One embodiment provides a switchable radio-frequency identification tag device. The device includes a first RFID module positioned on a first plane, at least one un-tuned antenna section positioned on a second plane, a shorting bar positioned on the second plane; and a sliding mechanism configured to move between a first position and a second position. The first plane is positioned parallel to the second plane. The first RFID module is coupled to the at least one un-tuned antenna section to form a tuned RFID tag in the first position. The first RFID module is coupled to the shorting bar in the second position.

In some embodiments, the device further includes a second RFID module positioned on the first plane, a third RFID module positioned on the first plane, and a second shorting bar. In such embodiments, the sliding mechanism is further configured to move between the first position, the second position, and a third position. In the first position, the RFID module is coupled to the at least one un-tuned antenna section to form a tuned RFID tag, and the second and third RFID modules are coupled to the first shorting bar. In the second position, the second RFID module is coupled to the at least one un-tuned antenna section to form a tuned RFID tag, the first RFID module is coupled to the second shorting bar, and third RFID module is coupled to the first shorting bar. In the third position, the third RFID module is coupled to the at least one un-tuned antenna section to form a tuned RFID tag, the first and second RFID modules are coupled to the second shorting bar.

Another embodiment provides a switchable radio-frequency identification (RFID) tag device. The device includes an RFID module positioned on a first plane, at least one un-tuned antenna section positioned on a second plane, and a sliding mechanism configured to move between a first position and a second position. The first plane is positioned parallel to the second plane. The RFID module is coupled to the at least one un-tuned antenna section to form a tuned RFID tag in the first position.

In some embodiments, the device further includes a second RFID module positioned on the first plane, and a third RFID module positioned on the first plane. In such embodiments, the sliding mechanism is further configured to move between the first position, the second position, and a third position. In the first position, the RFID module is coupled to the at least one un-tuned antenna section to form a tuned RFID tag, and the second and third RFID modules are not coupled to the at least one un-tuned antenna section. In the second position, the second RFID module is coupled to the at least one un-tuned antenna section to form a tuned RFID tag, the first and third RFID modules are not coupled to the at least one un-tuned antenna section. In the third position, the third RFID module is coupled to the at least one un-tuned antenna section to form a tuned RFID tag, the first and second RFID modules are not coupled to the at least one un-tuned antenna section.

Figure 1A:
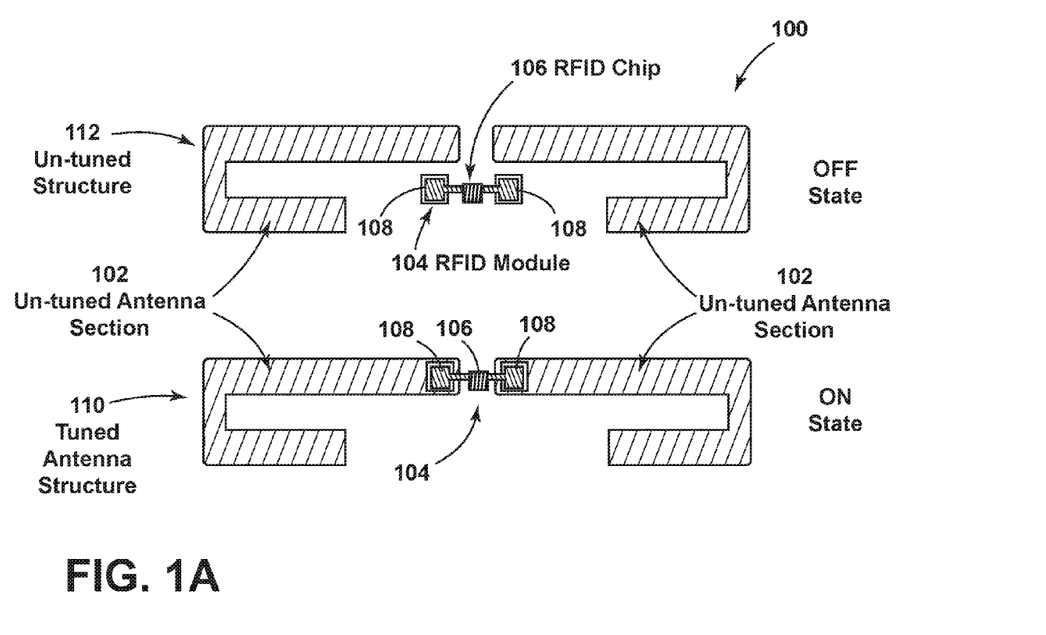
FIG. 1A is a top view of a switchable RFID tag, according to some embodiments.

FIG. 1A illustrates two top views (i.e., one in the "OFF state," and one in the "ON" state) of one exemplary embodiment of a long reading distance switchable RFID tag 100. The RFID tag 100 includes two un-tuned antenna sections 102 and an RFID module 104. The RFID module 104 includes an RFID chip 106 and two coupling pads 108. The RFID chip 106 includes hardware, software, or firmware or some combination of the foregoing, configured to respond to electromagnetic signals received from an RFID reader (not shown). The RFID chip 106 responds by transmitting a pre-programmed data string at a predetermined radio frequency. In one exemplary embodiment, the RFID chip 106 is designed to transmit radio signals in the UHF band (i.e., 902-928 MHz). RFID chips are known, and are not described herein in greater detail. The coupling pads 108 are coupled to the RFID chip 106 and are configured to couple (e.g., ohmically or capacitively) the RFID module 104 to suitable radiating elements, for example, the antenna sections 102.

The un-tuned antenna sections 102 are configured such that, when capacitively or ohmically coupled to the RFID module 104 (via the coupling pads 108), the antenna sections 102 and the RFID module 104 form a tuned antenna system 110, which is tuned to the predetermined frequency of the RFID chip 106, forming a tuned RFID tag. However, when not coupled to the RFID module 104, the antenna sections 102 simply form an un-tuned structure 112, which is incapable of sending or receiving radio signals at the predetermined frequency. The configurations of the antenna sections 102 are shown for illustrative purposes only. As appreciated by one skilled in the art, the physical shape of the antenna sections 102 will depend on factors such as, for example, the frequency and operational range of the RFID tag 100, or the dielectric material to which the antenna is attached.

Figure 1B:
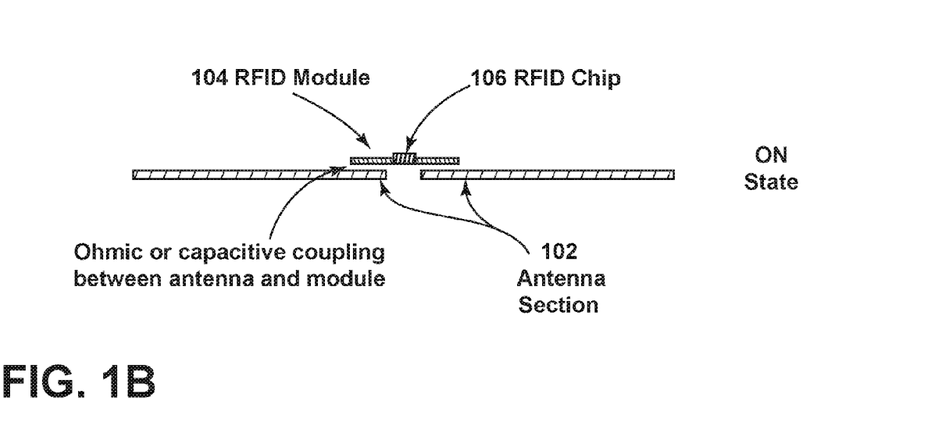
FIG. 1B is a side view of the switchable RFID tag of FIG. 1A, according to some embodiments.

As illustrated in FIG. 1B, the antenna sections 102 are located on a plane separate from plane containing the RFID module 108. In one exemplary embodiment, the planes are parallel and can be moved relative to each other using a suitable sliding mechanism (not shown). In some embodiments, the antenna section plane is fixed, and the RFID module plane is moveable. In some embodiments, the RFID module plane is fixed, and the antenna section plane is moveable. In alternative embodiments, both planes are moveable.

Returning to FIG. 1A, regardless of the configuration, the RFID module 104 is thus moveable between two or more positions relative to the antenna sections 102. For example, the RFID module 104 may be positioned in a first position, to align with and capacitively couple to the antenna sections 102 to form the tuned antenna system 110 and functional RFID tag ("ON State"). The RFID module 104 may also be positioned in a second position, apart from the antenna sections 102 ("OFF State"), resulting in the un-tuned structure 112.

Capacitive coupling is preferred for RFID tags operating in the UHF band. In some embodiments, the RFID module 104 is ohmically coupled to the antenna sections 102. When positioned apart from the antenna sections 102, the RFID module 104 does not function to send or receive radio signals. In alternative embodiments, the planes are not parallel, but are oriented such that they can be moved relative to each other using a suitable mechanism to couple and uncouple the antenna sections 102 from the RFID module 104.

The RFID tag 100 may be enclosed in a suitable case (not shown). In some embodiments, the cases are constructed from polyvinyl chloride (PVC) plastic, which minimizes product cost and provides a rugged encasement. In alternative embodiments, other suitable materials may be used. In some embodiments, the sliding mechanism can be designed to allow for external visual observation of the RFID module's position. In one example, when the slider mechanism positions the RFID module 104 to be coupled to the antenna sections 102, it simultaneously causes a portion of the case display the word "ON," the color green, or another indication that the RFID tag 100 is tuned and functional. Likewise, when the slider mechanism uncouples the RFID module 104 from the antenna sections 102, it simultaneously causes a portion of the case to display the word "OFF," the color red, or another indication that the RFID tag 100 is not functional.

Figure 2A:
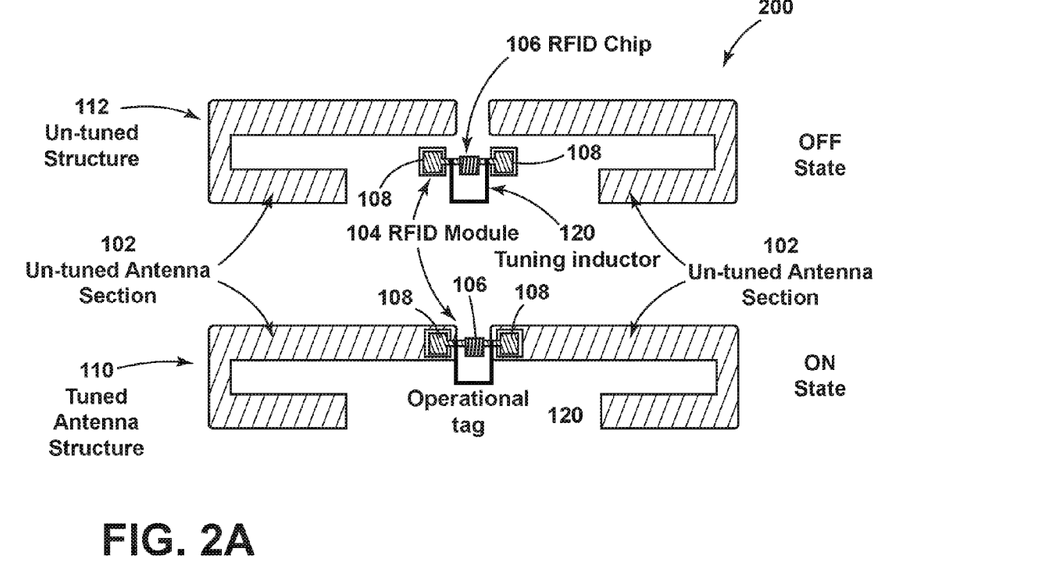
FIG. 2A and FIG. 2B schematically illustrate a switchable RFID tag that includes a tuning inductor, according to some embodiments.

FIG. 2A illustrates two top views (i.e., one in the "OFF state," and one in the "ON" state) of an exemplary embodiment of a long reading distance switchable RFID tag 200. The RFID tag 200 includes similar components to the RFID tag 100 (See FIG. 1A), which function similarly to the RFID tag 100. In the illustrated embodiment, the RFID module 104 includes a tuning inductor 120, connected in parallel with the RFID chip 106, as shown in FIG. 2A. In some instances, the addition of the tuning inductor 120 may result in the RFID module 104 itself acting as a short read distance tag, when it is not coupled to the antenna sections 102. Because the RFID module 104 is not coupled to the antenna structures 102, the resulting short read distance tag is not tuned to the predetermined frequency of the RFID chip 106.

Figure 2B:
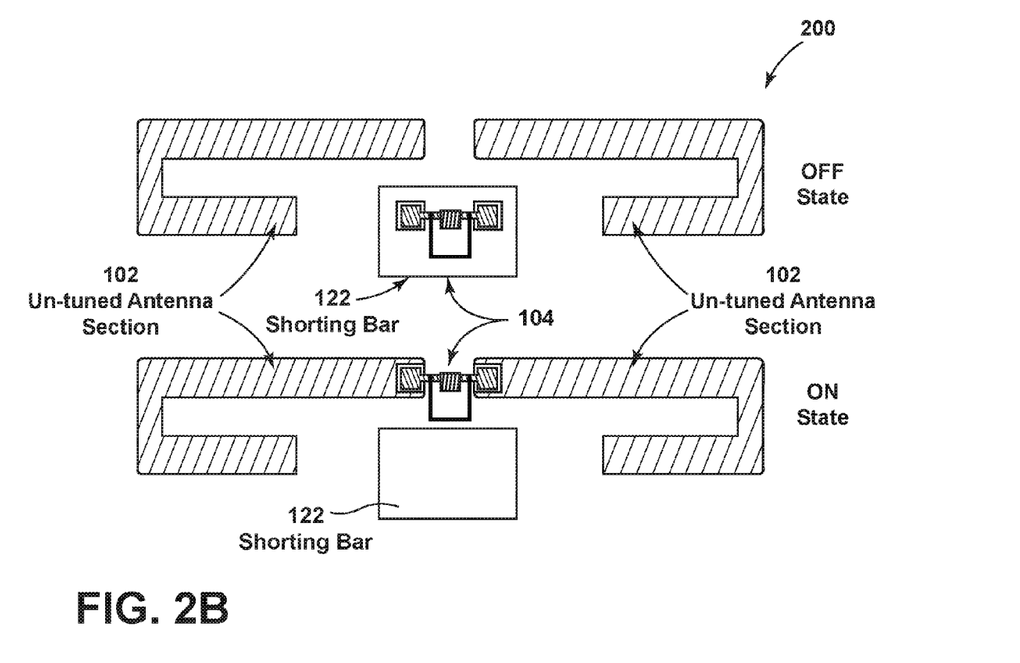

As illustrated in FIG. 2B, to counter this issue, the RFID tag 200 includes a conductive shorting bar 122, which is placed in close proximity to the area under the RFID module 104, on the same plane as the antenna sections 102. In some embodiments, the shorting bar may be made of a dielectric material. The RFID module 104 is coupled to the shorting bar 122 when in the OFF State, and is therefore inoperable.

Figure 3A:
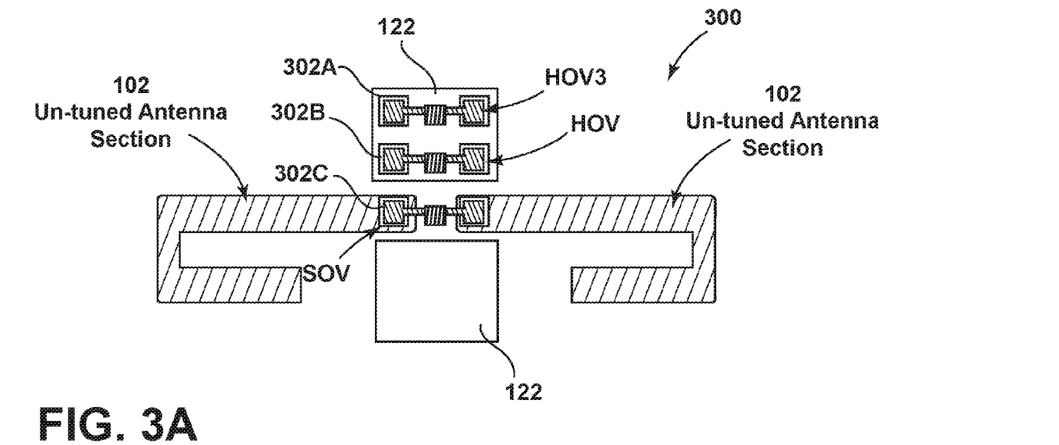
FIG. 3A, FIG. 3B, and FIG. 3C schematically illustrate a multi-module switchable RFID tag, according to some embodiments.
Figure 3B:
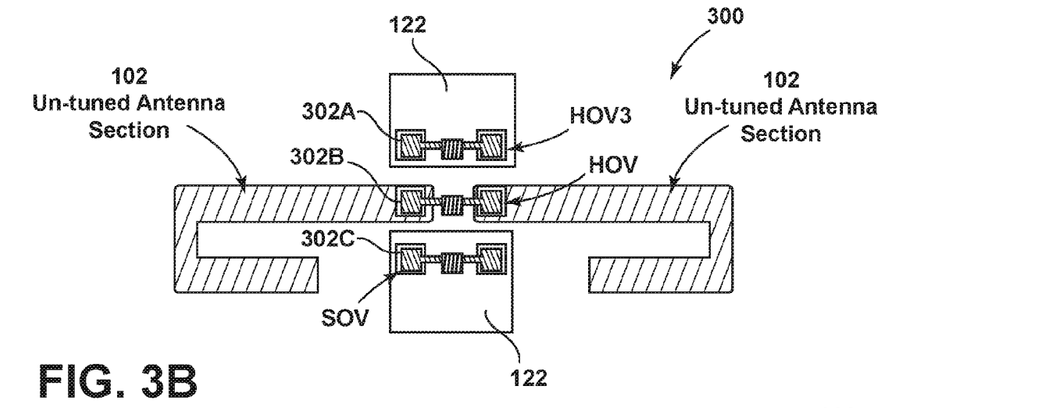
Figure 3C:
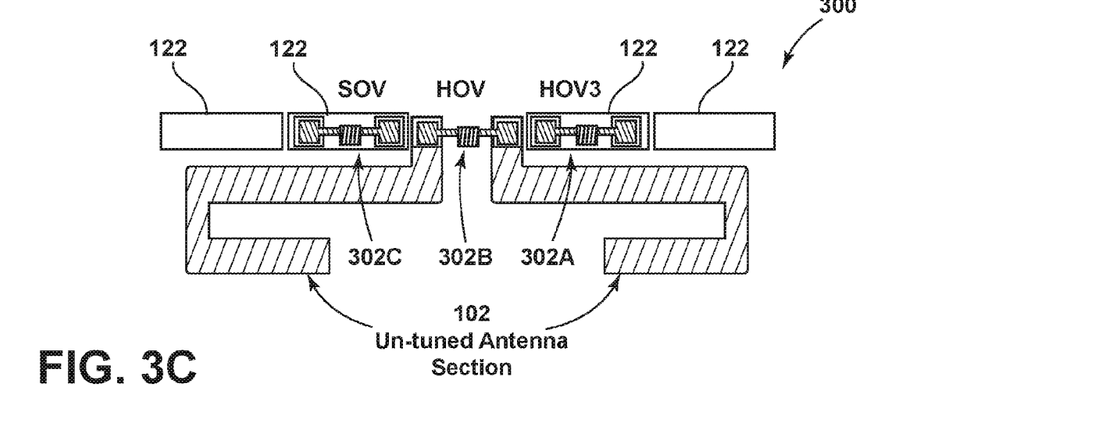

FIG. 3A, FIG. 3B, and FIG. 3C illustrate exemplary embodiments of a multi-state switching RFID tag 300. The RFID tag 300 includes three RFID modules 302A, 302B, 302C. Each module's RFID chip includes a different data string. In this example, the three RFID modules 302A, 302B, 302C contain data strings representing SOV, HOV, and HOV3. The three RFID modules 302A, 302B, 302C are positioned on the same plane, and two shorting bars 122 and the antenna sections 102 are positioned on another plane. The two planes are configured to move relative to each other using a mechanical means, and operate to couple the RFID modules 302A, 302B, 302C to either the antenna sections 102 or the shorting bars 122. In alternative embodiments, the shorting bars 122 may be placed on a third plane, apart from the antenna sections 102. In some embodiments, one or more of the planes may be fixed. In the example illustrated in FIG. 3A, the bottom RFID module 302C (SOV) is in position to form a tuned and functional RFID tag. Simultaneously, the other two RFID modules 302A, 302B (HOV, HOV3) are coupled to the shorting bars 122 and rendered inoperable. In this state, the RFID tag 300, if activated by a reader, would return the data string associated with SOV.

As illustrated in FIG. 3B, by moving the RFID modules 302A, 302B, 302C downward, the middle RFID module 302B (HOV) forms a tuned and functional RFID tag, and the other RFID modules 302A, 302C (SOV, HOV3) become inoperable. In this state, the RFID tag 300, if activated by a reader, would return the data string associated with HOV.

Alternative embodiments, illustrated in FIG. 3C, form the RFID tag 300 such that the RFID modules 302A, 302B, 302C can be moved horizontally. In example illustrated, the RFID module 302B containing the HOV data string is operable, while the other RFID modules 302A, 302C (SOV, HOV3) are coupled to shorting bars 122 and are inoperable. Sliding the modules to the right would activate the SOV RFID module 302C, and sliding the modules to the left would activate the HOV3 RFID module 302A. The other RFID modules would be inoperable while the operable RFID module is coupled to the antenna sections. Alternative embodiments include more than three RFID modules. In some embodiments, the RFID tag 300 includes sufficient shorting bars 122 such that all of the RFID modules 302A, 302B, 302C may be rendered inoperable simultaneously (i.e., all of the RFID modules are in an OFF State).

As noted above, the sliding mechanism may be designed to allow for external visual observation of the RFID tag's position. In some embodiments of multi-state switching RFID tags, the slider mechanism is configured to cause a portion of the case display a visual indicator of which RFID module is forming an active RFID tag. In some embodiments, each type of RFID module (e.g., SOV, HOV, HOV3) is visually indicated on the case, and the sliding mechanism causes a portion of the case to display a visual status indication for each RFID module.

Figure 4A:
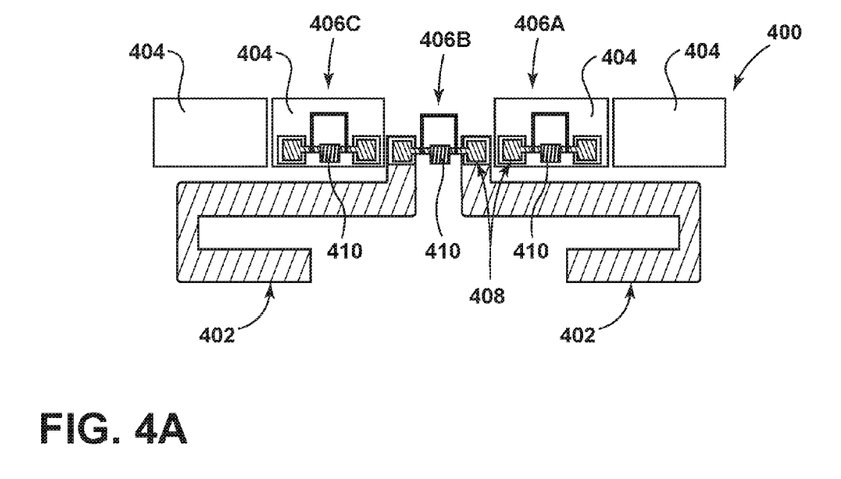
FIG. 4A and FIG. 4B schematically illustrate a multi-module switchable RFID tag that includes tuning inductors, according to some embodiments.

Certain parameters determine how well the RFID tag performs and increase the amount of isolation between the On and Off states. These parameters are discussed in relation to an exemplary three-position switchable RFID tag 400, as illustrated in FIG. 4A. The RFID tag 400 includes antenna sections 402, shorting bars 404, and RFID modules 406A, 406B, 406C. As set forth above, the RFID modules 406A, 406B, 406C each include two pads 408 and an RFID chip 410.

Figure 4B:
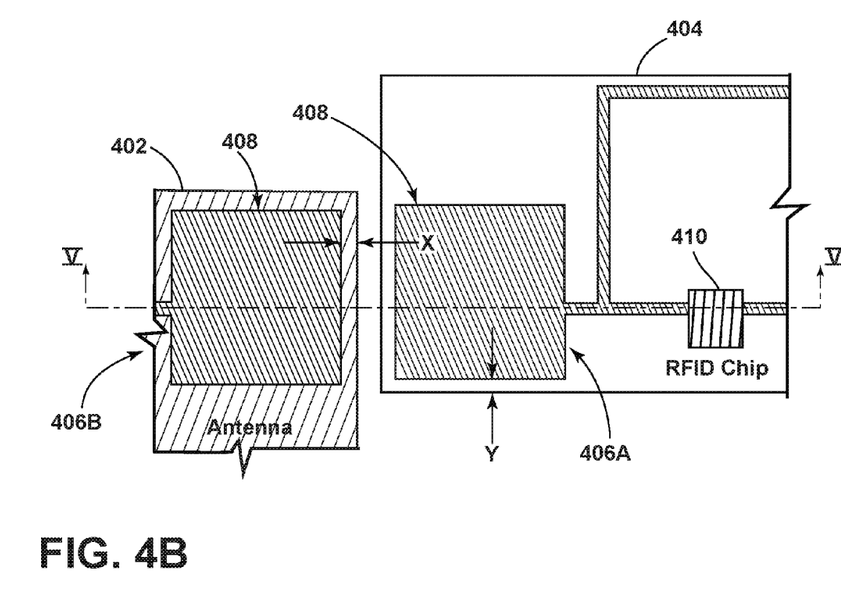

Included in the enlarged view of the pads, illustrated in FIG. 4B, the first parameter is the common area of the RFID module, antenna, and shorting plane. This is set by the RFID module pad 408. In some embodiments, the minimum size is, for example, approximately one-hundred mils on a side. The area should be large enough to result in a capacitance that allows a low impedance connection between the RFID module (e.g., 406B) and the antenna sections 402. This area is determined during the antenna section and RFID module design, and is affected by the spacing between the RFID module and the antenna sections.

The second parameter is the minimum overlap of the RFID module pad 408 by the antenna 402 and shorting bar 404. This parameter is designated in FIG. 4B as the "X" and "Y" dimensions. The minimum overlap is determined when designing the RFID tag case and position tolerance of the slide mechanism. In some embodiments, the dimensions "X" and "Y" are identical. In other embodiments, "X" and "Y" differ depending upon manufacturing tolerances and slider movement. One skilled in the art will appreciate that the dimensions listed herein are approximate and exemplary only, and the actual dimensions will vary from the approximations provided.

Figure 5:
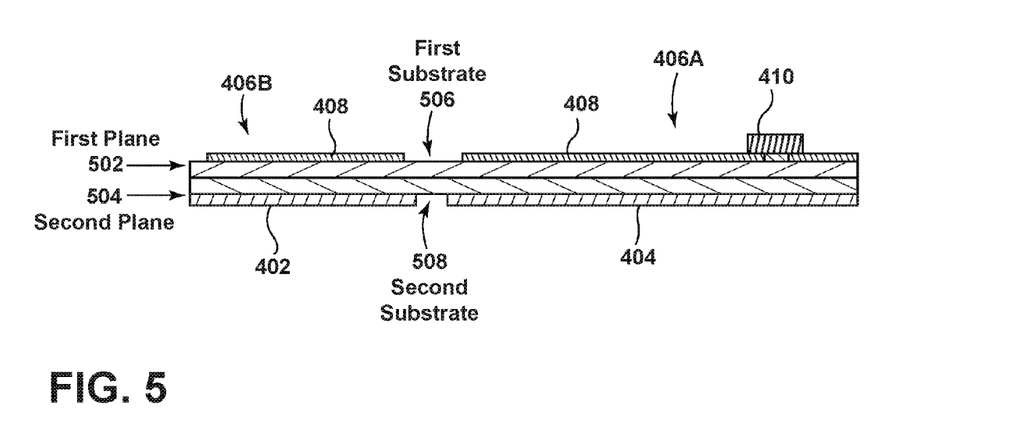
FIG. 5 is a cross sectional view of the internal components of a switchable RFID tag, according to some embodiments.

Known RFID tag assembly methods may be utilized to produce the structure of the antenna and shorting bar plane, and the RFID modules. In one exemplary embodiment, illustrated in FIG. 5 (a cross sectional view of the intersection line shown in FIG. 4B), the RFID modules 406A, 406B are on a first plane 502, while the antenna 402 and shorting bar 404 are formed on a second plane 504. In this example, both the first plane 502 and the second plane 504 are produced on a first substrate 506 and a second substrate 508, respectively. The first substrate 506 and the second substrate 508 may be made of high temperature Mylar™ (e.g., 2 or 3 mils in thickness). The thickness of the Mylar™ films forms the spacing between the RFID modules and the antenna sections. Mylar™ has a relative permittivity ($\epsilon r(\omega)$) of approximately three, whereas air has a relative permittivity of approximately one. The use of Mylar™ film substrates in close contact (that is, with little to no air between them) increases the capacitance and decreases the impedance between the RFID modules and the antenna sections.

Figure 6:
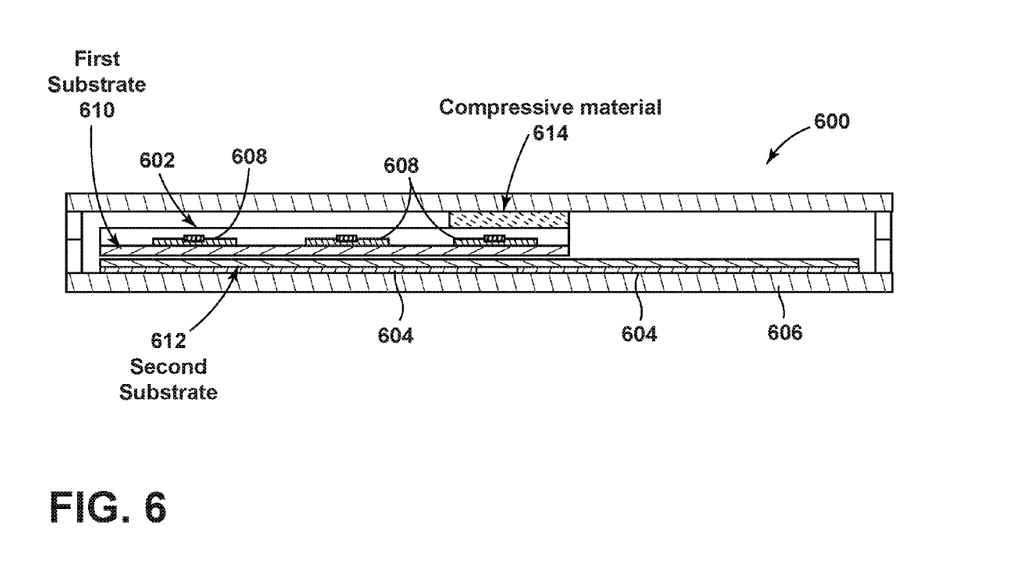
FIG. 6 is a cross sectional view of a switchable RFID tag within a case, according to some embodiments.

FIG. 6 illustrates a cross sectional view of an exemplary embodiment of a switchable RFID tag 600. The RFID tag 600 includes a slide 602, two antenna sections 604, and a case 606. The slide 602 includes three RFID modules 608. The slide is positioned on a first substrate 610 (e.g., made of Mylar™). The antenna sections 604 are formed on a second substrate 612 (e.g., made of Mylar™), which substrate is adhered to the case 606. The case 606 is made of a suitable material, for example, PVC, and includes a suitable compressive material 614, which is attached to the case and positioned to maintain sufficient pressure on the slide 602 to maintain close contact between the first substrate 610 and the second substrate 612. This close contact reduces the spacing, and thus the air, between the two Mylar™ layers. As noted above, this increases the capacitance and decreases the impedance between the RFID modules 608 and the antenna sections 604 (for the RFID module positioned over the antenna sections).

Thus, the invention provides, among other things, a switchable RFID tag. Various features and advantages of the invention are set forth in the following claims.

What is claimed is:

1. A switchable radio-frequency identification (RFID) tag device comprising:
   a first RFID module positioned on a first plane;
   at least one un-tuned antenna section positioned on a second plane;
   a shorting bar positioned on the second plane; and
   a sliding mechanism configured to move between a first position and a second position;
   wherein the first plane is positioned parallel to the second plane,
   the first RFID module is coupled to the at least one un-tuned antenna section to form a tuned RFID tag in the first position, and
   the first RFID module is coupled to the shorting bar in the second position.

2. The device of claim 1, wherein the first RFID module includes an RFID chip and two coupling pads.

3. The device of claim 1, wherein the first RFID module includes a tuning inductor.

4. The device of claim 1, wherein the first RFID module is formed on a first polyester film substrate, the first polyester film substrate being positioned on the first plane, and
   the shorting bar and the at least one un-tuned antenna section are formed on a second polyester film substrate, the second polyester film substrate being positioned on the second plane.

5. The device of claim 1, further comprising:
   a second RFID module positioned on the first plane;
   a third RFID module positioned on the first plane; and
   a second shorting bar;
   wherein the sliding mechanism is further configured to move between the first position, the second position, and a third position; and wherein, in the first position, the RFID module is coupled to the at least one un-tuned antenna section to form a tuned RFID tag, and the second and third RFID modules are coupled to the first shorting bar; and in the second position, the second RFID module is coupled to the at least one un-tuned antenna section to form a tuned RFID tag, the first RFID module is coupled to the second shorting bar, and third RFID module is coupled to the first shorting bar; and in the third position, the third RFID module is coupled to the at least one un-tuned antenna section to form a tuned RFID tag, the first and second RFID modules are coupled to the second shorting bar.

6. The device of claim 5, wherein the first, second, and third RFID module, the first and second shorting bar, the at least one un-tuned antenna section, and the sliding mechanism are enclosed in a case.

7. The device of claim 6, wherein
the sliding mechanism causes a first visual indicator to display on the case when in the first position, and
the sliding mechanism causes a second visual indicator to display on the case when in the second position, and
the sliding mechanism causes a third visual indicator to display on the case when in the third position.

8. The device of claim 6, wherein the first, second, and third RFID modules are formed on a first polyester film substrate, the first polyester film substrate being positioned on the first plane; and
the first and second shorting bar and the at least one un-tuned antenna section are formed on a second polyester film substrate, the second polyester film substrate being positioned on the second plane and adhered to the case.

9. A switchable radio-frequency identification (RFID) tag device comprising:
an RFID module positioned on a first plane;
at least one un-tuned antenna section positioned on a second plane; and
a sliding mechanism configured to move between a first position and a second position;
wherein the first plane is positioned parallel to the second plane, and
the RFID module is coupled to the at least one un-tuned antenna section to form a tuned RFID tag in the first position.

10. The device of claim 9, wherein the RFID module includes an RFID chip and two coupling pads.

11. The device of claim 9, wherein the first RFID module is formed on a first polyester film substrate, the first polyester film substrate being positioned on the first plane, and
the at least one un-tuned antenna section is formed on a second polyester film substrate, the second polyester film substrate being positioned on the second plane.

12. The device of claim 9, further comprising:
a second RFID module positioned on the first plane;
a third RFID module positioned on the first plane;
wherein the sliding mechanism is further configured to move between the first position, the second position, and a third position; and
wherein, in the first position, the RFID module is coupled to the at least one un-tuned antenna section to form a tuned RFID tag, and the second and third RFID modules are not coupled to the at least one un-tuned antenna section; and in the second position, the second RFID module is coupled to the at least one un-tuned antenna section to form a tuned RFID tag, the first and third RFID modules are not coupled to the at least one un-tuned antenna section; and in the third position, the third RFID module is coupled to the at least one un-tuned antenna section to form a tuned RFID tag, the first and second RFID modules are not coupled to the at least one un-tuned antenna section.

13. The device of claim 12, wherein the first, second, and third RFID module, the at least one un-tuned antenna section, and the sliding mechanism are enclosed in a case.

14. The device of claim 13, wherein
the sliding mechanism causes a first visual indicator to display on the case when in the first position, and
the sliding mechanism causes a second visual indicator to display on the case when in the second position, and
the sliding mechanism causes a third visual indicator to display on the case when in the third position.

15. The device of claim 13, wherein the first, second, and third RFID modules are formed on a first polyester film substrate, and the first polyester film substrate is positioned on the first plane; and
the at least one un-tuned antenna section is formed on a second polyester film substrate, the second polyester film substrate being positioned on the second plane and adhered to the case.

* * * * *